C. H. MOSHER.
LAWN CLEANER.
APPLICATION FILED AUG. 11, 1910.

998,544.

Patented July 18, 1911.

2 SHEETS—SHEET 1.

WITNESSES:
H. J. Walker
E. B. Marshall

INVENTOR
Clarence H. Mosher
BY
ATTORNEYS

C. H. MOSHER.
LAWN CLEANER.
APPLICATION FILED AUG. 11, 1910.

998,544.

Patented July 18, 1911.
2 SHEETS—SHEET 2.

WITNESSES:
H. J. Walker
E. B. Marshall

INVENTOR
Clarence H. Mosher
BY Munn & Co.
ATTORNEYS

UNITED STATES PATENT OFFICE.

CLARENCE HENRY MOSHER, OF SALISBURY MILLS, NEW YORK.

LAWN-CLEANER.

998,544.     Specification of Letters Patent.     Patented July 18, 1911.

Application filed August 11, 1910. Serial No. 576,734.

*To all whom it may concern:*

Be it known that I, CLARENCE H. MOSHER, a citizen of the United States, and a resident of Salisbury Mills, in the county of Orange and State of New York, have invented a new and Improved Lawn-Cleaner, of which the following is a full, clear, and exact description.

My invention relates to lawn cleaners, and it has for its object to provide side members, to which are pivoted members carrying a shaft having rake teeth and a bar having hooks, the shaft being rotated by gearing connected with the wheels supporting the side members. The pivoted members are adjustable relatively to the side members and means are provided for holding them in adjusted positions relatively thereto.

Another object of the invention is to provide a floor member having an extension member hinged thereto, the extension member being adjustable relatively to the side members and means being provided for holding it in position relatively thereto. A container, having a U-shaped member, is disposed under the floor member and is secured to the side members, the container being also supported by links connecting it with the handle arms.

Still other objects of the invention will appear in the following complete description.

In this specification I will describe the preferred form of my invention, it being understood that the scope of the invention is defined in the appended claims.

Reference is to be had to the accompanying drawings forming a part of this specification, in which similar characters of reference indicate corresponding parts in all the views, and in which—

Figure 1:
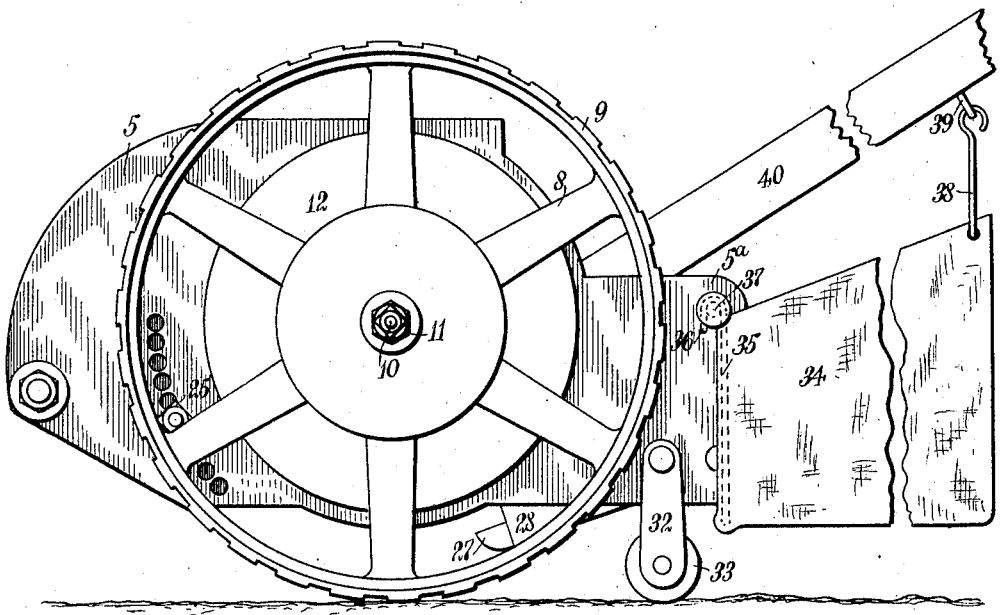
Figure 2:
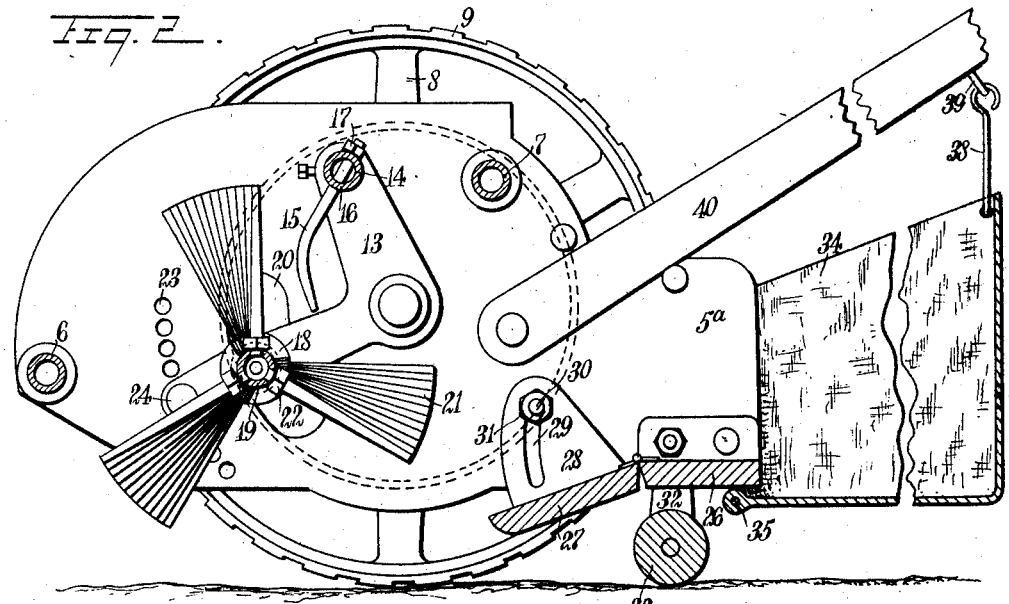
Figure 3:
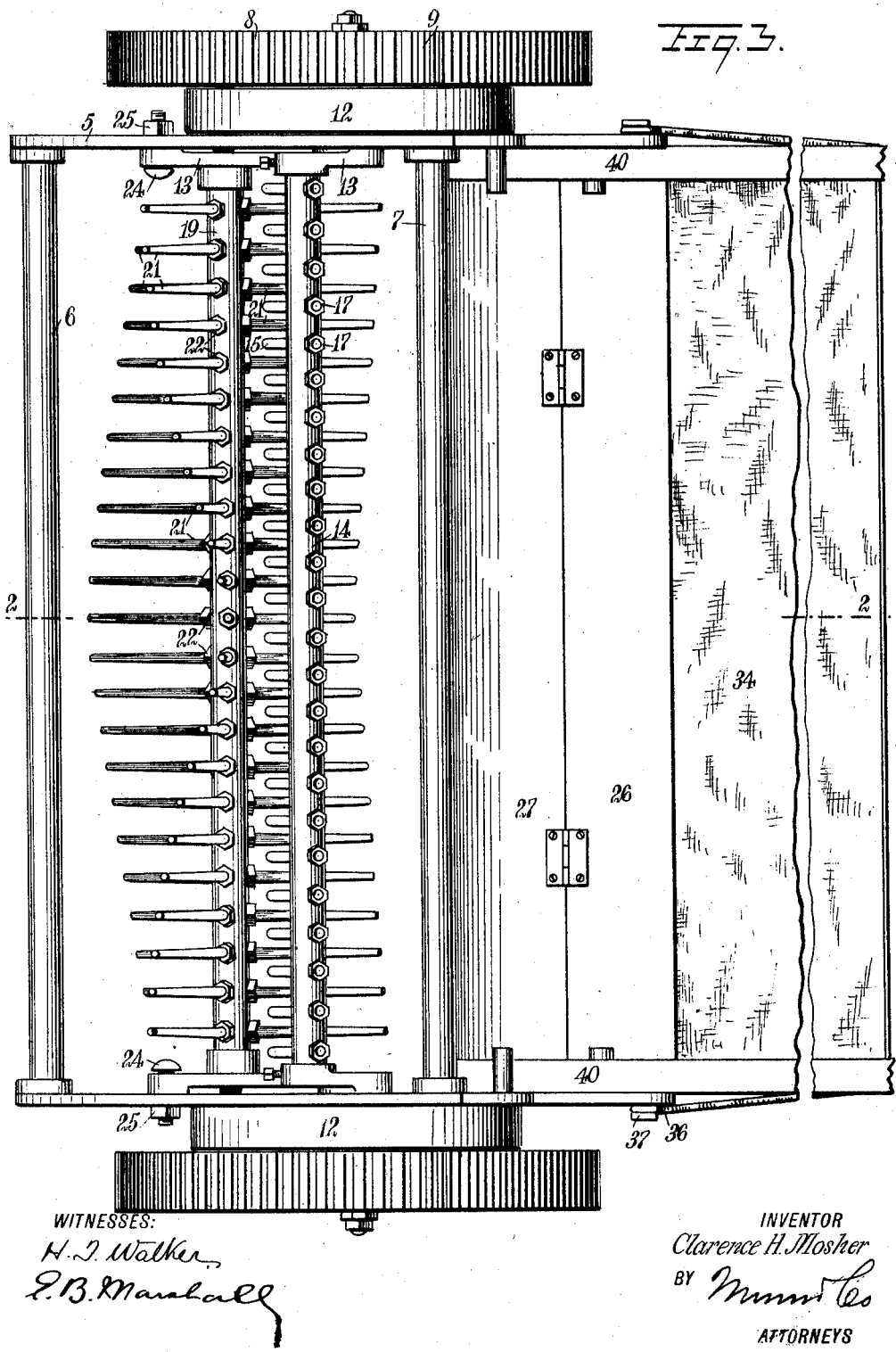

Figure 1 is a side elevation of the invention; Fig. 2 is a side sectional elevation on the line 2—2 of Fig. 3; and Fig. 3 is a plan view of the invention.

By referring to the drawings, it will be seen that side members 5 are provided, which are connected by bars 6 and 7. Wheels 8, having roughened tires 9, are mounted on axles 10 which project outwardly from the side members 5, the wheels 8 being held in place on the said axles 10 by nuts 11 in a manner well understood in the art. To the inner sides of these wheels 8 are secured casings 12, carrying an inner gear wheel. To the inner side of each of the side members 5, concentrically with the axles 10, is pivoted an angular member 13, a rod 14 being secured to one set of terminals of the angular members 13. Hooks 15 are provided, these hooks 15 being spaced apart and being disposed through openings 16 in the tube 14. Nuts 17 are provided, which mesh on the upper threaded terminals of the hooks 15, to hold them in place relatively to the tube 14. The lower terminals of the hooks 15 are bent rearwardly, as best shown in Fig. 2 of the drawings. In bearings 18, in the angular members 13 is journaled a hollow shaft 19, this hollow shaft 19 extending through the bearings 18 and also through openings 20 in the side members 5. To each of the terminals of the hollow shaft is secured a gear wheel which meshes with the gear wheel having the inner teeth secured to the casings 12, mounted on the wheels 8 respectively.

Rake teeth 21 are secured to the hollow shaft 19. I prefer to secure these rake teeth 21 to the hollow shaft 19 by providing the inner terminals of the rake teeth 21 with threaded surfaces which mesh in threaded orifices in the hollow shaft 19, lock nuts 22 being provided, which also mesh on the threaded terminals of the rake teeth 21 and engage the hollow shaft 19. I prefer to provide the hollow shaft 19 with three sets of these rake teeth 21; but it will be understood that any desired number of rake teeth may be used without departing from my invention. In each set of the rake teeth, the outer teeth are stepped in advance of the inner teeth, so that the outer teeth will be disposed considerably in advance of the central teeth when the shaft 19 is rotated under normal conditions. This is done so that when the material is engaged by the side teeth, it will be moved toward the center line of the machine.

In each of the side members 5 there is a series of orifices 23 disposed concentrically with the shafts 10, there being orifices in the angular member 13 in which bolts 24 are disposed, these bolts being adapted to be disposed through the orifices 23, respectively, to hold the angular members 13 in position on the side members 5 after they have been adjusted relatively thereto. Nuts 25 are provided for engaging the bolts 24 at the outer sides of the side members.

To the rearwardly-extending portions 5<sup>a</sup> of the side members is secured a floor member 26, this floor member extending from one of the said rear portions 5<sup>a</sup> to the other. An extension member 27 is hinged to the forward end of the floor member 26, side plates 28 being secured to the extension member 27, these side plates having curved slots 29 in which bolts 30 are disposed, the bolts 30 being secured to the inner sides of the side members 5. Nuts 31 are provided for engaging the bolts 30, these nuts 31, when turned home, engaging the side plates 28 to hold the said side plates and the extension member 27 in position relatively to the side members 5. Legs 32 are secured to the outer sides of the rearwardly-extending portions 5<sup>a</sup> of the side members 5, rollers 33 being mounted on these legs 32. A container 34 is provided, this container 34 having a U-shaped member 35 at its forward end, the U-shaped member 35 being disposed under the rearwardly-extending portions 5<sup>a</sup> of the side members 5 and also under the floor 26, the sides of the U-shaped members 35 extending upwardly and being provided with hooks 36 which engage lugs or buttons 37 projecting outwardly from the rearwardly-extending portions 5<sup>a</sup> of the side members 5. The container 34 is also supported at its rear end by means of links 38, which are secured to the container and which engage the eyes 39 on handle arms 40, these handle arms 40 being secured to the inner sides of the side members 5.

In using the invention, when the machine is pushed forwardly, the wheels 9 will rotate, thereby rotating the hollow shaft 19 by means of the gearing secured to the casing 12 and which meshes with the gear wheel on the said hollow shaft 19. As the hollow shaft 19 rotates, the rake teeth 21 are carried with it, passing rearwardly under the said hollow shaft 19 and throwing the material, with which they come in contact, upwardly and rearwardly in the direction of the container 34, the material being prevented from being carried forward by the said hollow shaft 19 by means of the hooks 15, which are disposed between the planes of movement of the said rake teeth 21. As the hollow shaft 19 rotates, the hooks 15 remove from the teeth 21 any material which may have become affixed to them in the course of the operation of the machine.

The adjustable features of my machine are very important features of the invention for, as will readily be seen, the angular members 13 may be adjusted relatively to the side members 5, so that the rake teeth 21 will pass at a predetermined distance from the ground when the hollow shaft 19 is rotated, the hooks 15 being always disposed in position relatively to the said rake teeth. It is also possible to adjust the extension member 27, so that it may also be disposed a predetermined distance above the ground and be secured in this position.

Having thus described my invention, I claim as new and desire to secure by Letters Patent:

1. In a lawn cleaner side members, wheels supporting the side members, members with bearings mounted on the side members concentrically with the wheels and adapted to be moved relatively to the side members, a shaft journaled in the bearings, projecting members secured to the shaft, a rod secured to the second-mentioned members, a projecting member secured to the rod, and means by which the wheels rotate the shaft.

2. In a lawn cleaner, side members having axles, respectively, wheels mounted on the axles, members, with bearings, mounted on the side members, a shaft journaled in the bearings, teeth spaced apart and secured to the shaft, a rod secured to the second-mentioned members, hooks secured to the rod and disposed between the paths of the teeth, and gearing connecting the wheels with the shaft.

3. In a lawn cleaner, side members, each having an axle and a series of orifices, wheels mounted on the axles, members with bearings, pivoted to the side members, a shaft journaled in the bearings, teeth spaced apart and secured to the shaft, a rod secured to the second-mentioned members, hooks secured to the rod and disposed between the paths of the teeth, respectively, gearing connecting the wheels with the shaft, there being orifices in the second-mentioned members, and bolts disposed in the orifices, the said bolts being also adapted to engage the orifices in the side members, to hold the second-mentioned members relatively thereto.

4. In a lawn cleaner, side members, each having an opening, an outer axle and a series of orifices, wheels mounted on the axles, respectively, members having bearings and orifices, pivoted to the side members, concentrically with the axles, a shaft projecting through the bearings and the openings in the side members and journaled in the said bearings, gear wheels on the shaft beyond the side members, gearing on the wheels which meshes with the gear wheels, teeth spaced apart and secured to the shaft, a rod secured to the second-mentioned members, hooks on the rod, and bolts disposed through the orifices in the side members and in the second-mentioned members for holding the latter relatively to the side members.

In testimony whereof I have signed my name to this specification in the presence of two subscribing witnesses.

CLARENCE HENRY MOSHER.

Witnesses:
BRADNER CAMERON,
J. N. BREWSTER.

Copies of this patent may be obtained for five cents each, by addressing the "Commissioner of Patents, Washington, D. C."